April 11, 1939.  F. M. GRIETEN  2,153,923

FISHING REEL

Filed July 3, 1937  3 Sheets-Sheet 1

Inventor.
F. M. Grieten
By Mason Fenwick & Lawrence
Attorneys

April 11, 1939. F. M. GRIETEN 2,153,923
FISHING REEL
Filed July 3, 1937 3 Sheets-Sheet 2
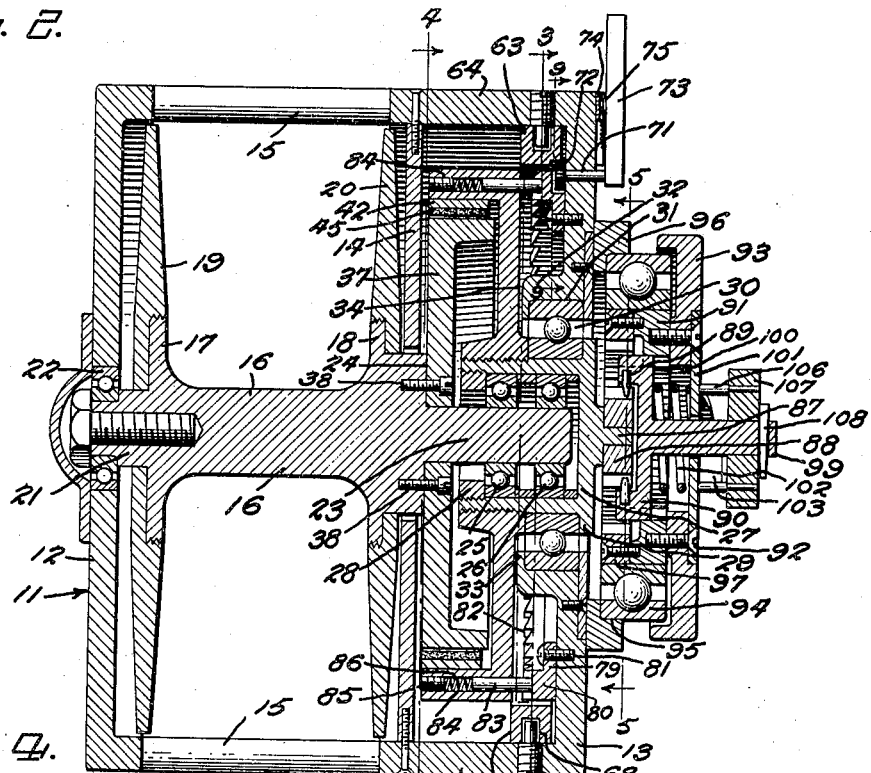
Fig. 2.
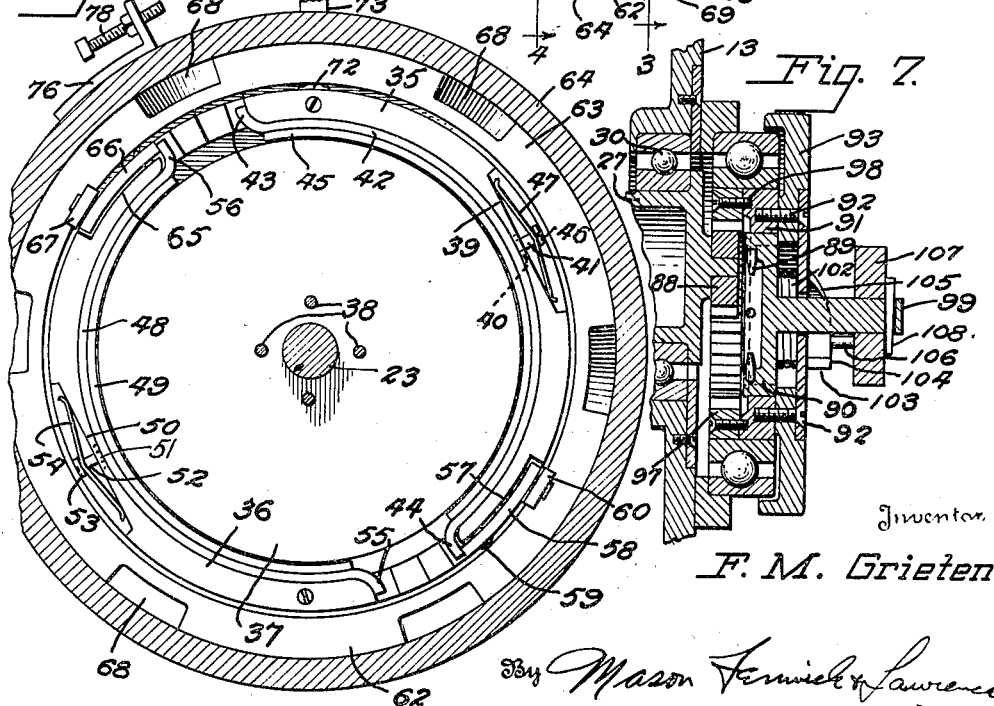
Fig. 4.
Fig. 7.
Inventor
F. M. Grieten
By Mason Fenwick & Lawrence
Attorneys April 11, 1939.  F. M. GRIETEN  2,153,923
FISHING REEL
Filed July 3, 1937  3 Sheets-Sheet 3
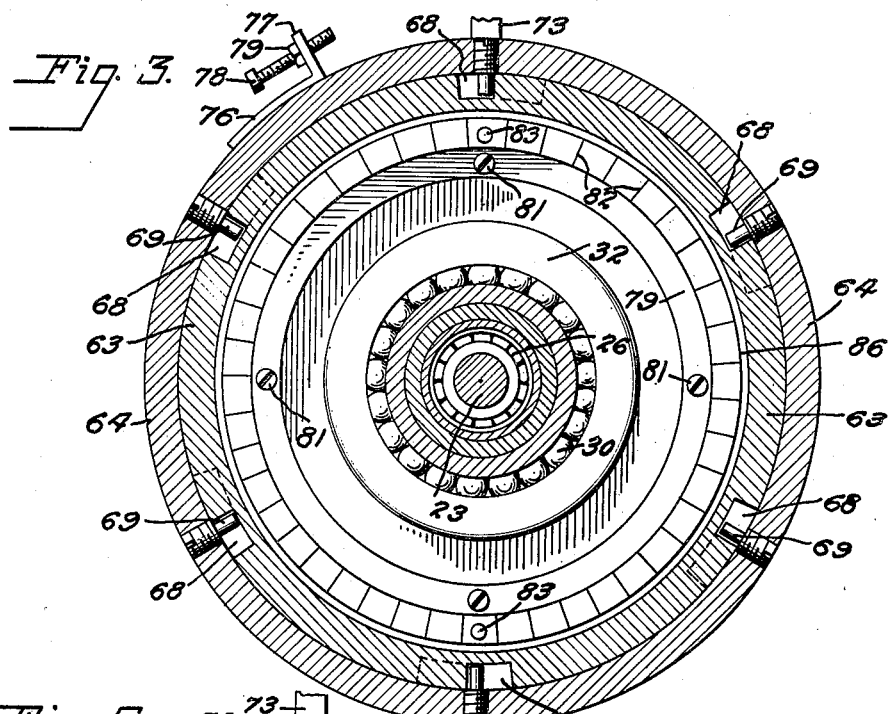
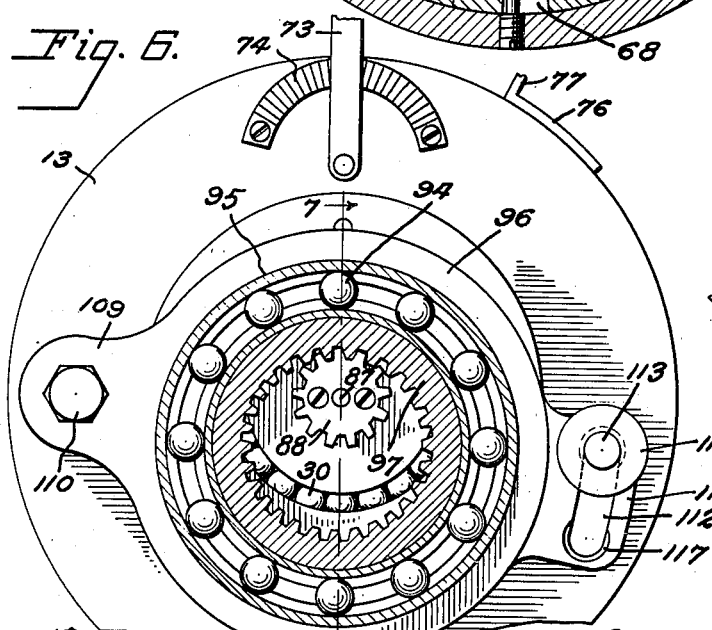
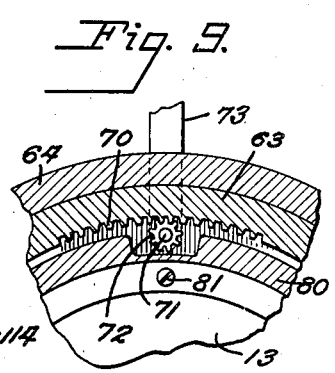
Inventor
F. M. Grieten
By Mason Fenwick & Lawrence
Attorneys Patented Apr. 11, 1939

2,153,923

UNITED STATES PATENT OFFICE 2,153,923

FISHING REEL

Frederick Martin Grieten, Miami, Fla.

Application July 3, 1937, Serial No. 151,927

9 Claims. (Cl. 242—84.5)

The invention forming the subject matter of this application relates to fishing reels in general; and, more particularly to fishing reels designed to be mounted on a fixed support for use in catching large salt-water game fish.

The main object of the invention is to provide a fishing reel, of the character referred to, with brake mechanism adjustable to exert any desired braking effect upon the spool.

Another object of the invention is to provide a reel of the character described with means by which the rate of rotation of the spool may be varied by readily adjustable gear mechanism.

Other objects of the invention will become apparent as the detailed description thereof proceeds.

In the drawings:

Figure 2 is a section taken on the line 2—2 of Figure 1;

Figure 3 is a section taken on the line 3—3 of Figure 2;

Figure 4 is a section taken on the line 4—4 of Figure 2;

Figure 6 is a vertical transverse section taken in the plane indicated by the line 5—5 of Figure 2, but with the parts shown in a different operative position;

Figure 7 is a section taken on the line 7—7 of Figure 6;

Figure 8 is a fragmentary top plan view of the operating end of the fishing reel;

Figure 9 is a sectional detail of part of the brake adjusting elements of the reel.

Figure 1:
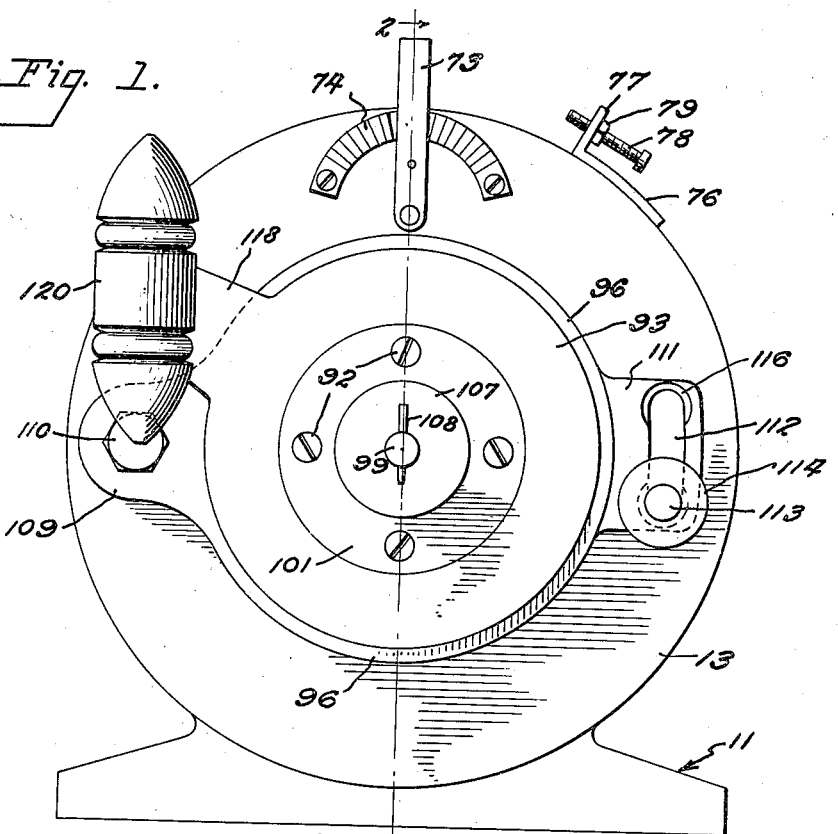
Figure 1 is a side elevation of a fishing reel constructed in accordance with the present invention.

As shown in the drawings, the reel comprises a frame designated generally by the reference numeral 11. This frame 11 includes end walls 12 and 13, and an intermediate partition 14, secured in assembled relation by means of cross bars 15 commonly used for this purpose. The partition 14 merely serves to separate the line winding parts of the reel proper from the mechanism used to regulate the tension of the brake mechanism and to change the gear ratio involved in the winding of the reel.

The shaft 16 of the reel is provided with flanges 17 and 18 within the space formed by the end wall 12 and partition 14. These flanges 17 and 18 have suitably secured thereto the circular plates 19 and 20, respectively, which serve to limit the transverse movement of the line upon the shaft 16. An extension 21 of shaft 16 is journaled in a ball bearing 22 suitably secured in the end wall 12 of the frame. At its other end, the shaft 16 is reduced to form an extension 23 and a shoulder 24. The extension 23 is journaled by ball bearings 25 and 26 in a cup 27 having the inner end thereof internally screwthreaded to receive the locking ring 28.

The cup 27 is provided with a flange 29 against which is seated one of the raceways of a ball bearing designated generally by the reference numeral 30. The ball bearing 30 is positioned within a recess 31 formed in a boss 32 extending inwardly of the end wall 13. A flange 33 on the inner end of the boss 32 forms a lateral annular stop for the ball bearing 30. The cup 27 is screwthreaded at its inner end to receive the plate 34, having segmental flanges 35 and 36 extending inwardly over a brake drum 37 secured to the shoulder 24 by means of the machine screws 38.

The flange 35 is provided with a recess 39, the bottom of which is provided with a slot 40 to receive the shank of a rod 41 secured to the center of a brake shoe 42. The opposite ends of the shoe 42 are bent around the opposite ends of the segmental flange 35 to form upturned flanges 43 and 44; and the shoe 42 is shaped to conform to the shape of the segmental flange and the cylindrical surface of the drum 37. The shoe 42 has suitably secured to the inner face thereof, a strip 45 of brake lining. As shown in Figure 4 of the drawings the brake shoe 42 is secured only at its center to the segmental flange 35 by means of the pin 41. The pin 41 is axially bored and screwthreaded to receive a machine screw 46 to secure a centrally apertured leaf spring 47 in position in the recess 39 to hold the shoe 42 yieldingly in contact with the inner cylindrical face of the flange 35.

The segmental flange 36 has similarly secured thereto, an adjustable brake shoe 48 having the brake lining 49 secured to the inner face thereof. The flange 36 is likewise provided with a central recess 50 having a slot 51 receiving the pin 52 secured to the center of the brake shoe 48. A machine screw 53 secures the centrally apertured leaf spring 54 in position in the recess 50 to maintain the brake shoe 48 and its lining normally out of braking contact with the brake drum.

Figure 10:
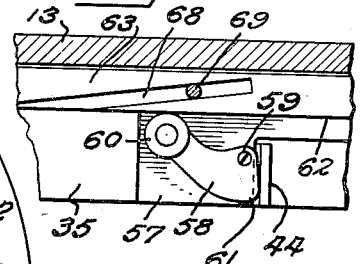
Figure 10 is a fragmentary detail of other parts of the brake adjusting mechanism.

As shown in Figure 4, the opposite ends of the brake shoe 48 are turned around the opposite end of the segmental flange 36 to form end flanges 55 and 56, respectively. For the purpose of adjusting the brake lining into contact with the brake drum, the segmental flange 35 is provided at one end with a recess 57 in which a bell crank lever 58 is mounted to pivot about a pin 59. One end of the bell crank lever has a roller 60 pivoted thereto. The other end 61 of the bell crank lever is normally in contact with the upturned flange 44 of the brake shoe 42. As shown in Figure 10 of the drawings, the bell crank lever 58 is so designed that the resilient pressure of the flange 44 on the end of the bell crank arm 61 maintains the roller 60 always in contact with the flat side 62 of a brake adjusting ring 63, mounted for limited rotation and sliding movement within the cylindrical flange 64 forming part of the framework of the reel and extending inwardly from the end wall 13.

The segmental flange 36 is provided at one end with a recess 65 in which is pivoted a bell crank lever 66, similar in every respect to the bell crank lever shown in Figure 10 of the drawings. A roller 67 at the outer end of the long arm of the bell crank lever is held in constant contact with the inner face of the brake adjusting ring 63 by the resilience of the upturned flange 56 on the end of the brake shoe 48. As shown in Figure 4 of the drawings, the bell cranks 58 and 66 are diametrically opposite to each other, so that any pressure applied by the axial inward movement of the ring 63 will serve to extend the two brake shoes evenly around the brake drum so as to effect an evenly distributed braking pressure on the said brake drums.

To effect the brake adjusting movement of the ring 63, the latter is provided in the periphery thereof with a series of inclined slots 68 (see Figure 10). In Figure 4 of the drawings, six of these slots are shown in elevation. A corresponding number of pins 69 project radially from the flange 64 into the slots 68, the pins being screw-threaded, as shown in Figure 3 of the drawings, into radial apertures formed in the flange 64. It will be evident from inspection of Figures 3, 4 and 10 that if the ring 63 be rotated in anti-clockwise direction, the camming effect of the slots 68 on the pins 69 will cause the ring to move axially inward of the frame-work. This inward movement acting on the rollers 60 and 67 of the bell crank levers 58 and 66, will extend the brake shoes 42 and 48 lengthwise so as to force the brake lining into braking contact with the brake drum. Obviously rotation of the ring 63 in the opposite direction will release the brake shoes from their braking contact with the brake drum.

To effect the slight rotation of the ring 63 necessary to operate the brake, a segment of the ring 63 is provided with gear teeth 70 (see Figure 9). A small shaft 71 journaled in the end wall 13 of the frame, has a pinion 72 fixed to its inner end and an adjusting lever or handle 73 fixed to its outer end. A segmental plate 74 fixed to the end wall 13 has its face notched to receive a "click" 75 (see Figure 8), formed on a leaf spring secured to the inner face of the adjusting handle 73 in position to swing over the said plate 74.

It will be obvious from inspection of Figures 1, 5, 8 and 9 of the drawings that the lever or handle 73 may be held in any desired position of adjustment by engagement of the "click" 75 with the notches on the face of the plate 74; and that this position of handle adjustment will determine the degree of braking force effect applied to the brake drum. The flange 64 has a bracket 76 suitably secured thereto, with an upturned flange 77 screw-threaded to receive a screwthreaded stop rod 78 extending into the path of movement of the handle 73 to limit the movement thereof.

A lock nut 79 serves to lock the rod 78 in any desired position of adjustment. To limit the rotation of the spool in one direction, a ratchet ring 79, having an inwardly directed annular flange 80 is secured to the end wall 13 by machine screws 81. Ratchet teeth 82 formed on the ring 79 are engaged by pins 83 which are slidably mounted in bores 84 formed parallel to the axis of the reel through the circular plate 34 and the segmental flanges 35 and 36. Set screws 85 plug the inner ends of the bores 84, and compression springs 86, interposed between these set screws 85 and pins 83, maintain the pins on constant contact with the ratchet teeth 82.

To impart rotation to the reel shaft 16, the outer flat face of the cup 27 is provided with an axial extension 87 to which is suitably secured a pinion 88. The teeth of the pinion 88 are adapted to be engaged by a series of pins 89 (see Figure 5), extending inwardly from a spline member 90. The external teeth of this member 90 merely operate as splines for connecting the member 90 slidably to internal gear teeth formed on a ring 91, secured by machine screws 92 to the crank plate 93. The crank plate 93 is mounted for rotation by means of the ball bearing 94, seated in an annular recess 95 formed in a supporting ring 96 adapted to swing about a pivot fixed to the end wall 13.

An internal gear ring 97 is secured to the ring 91 by means of a machine screw 98. The internal diameter of the ring 97 is slightly larger than the external diameter of the spline member 90, to permit this spline member to slide inwardly along the axis of the reel for the purpose of causing the pins 89 to engage the teeth of the pinion 88, whenever the reel is desired to be rotated in 1:1 ratio, which is the ratio indicated by the position of the parts shown in Figure 2. When a higher ratio is desired the spline gear 90 is pulled outwardly from the pinion 88 to the position shown in Figure 7 in which the pins 89 are shown clear of the teeth of the pinion 88.

The spline member 90 has a rod 99 extending axially from its outer surface; and the crank plate 93 has a central aperture 100, normally closed by a cover plate 101, which is centrally apertured to permit the sliding movement of the rod 99 therethrough. A compression spring 102 surrounds the rod 99 and is interposed between the cover plate 101 and the outer face of the spline member 90 for the purpose of holding the spline gear with the pins 89 normally engaging the teeth of the pinion 88.

For the purpose of effecting the outward adjustment of the spline gear 90 against the compression of the spring 102, the cover plate 101 has a cylindrical cam boss 103 extending from its outer face. The outer edge 104 of the boss 103 lies in a plane parallel to the face of the cover plate 101; and the boss is cut away at diametrically opposite points to form cam surfaces 105 (see Figure 8) along which the cam pins 106 are adapted to slide when rotary movement is imparted thereto by means of a knurled thumb piece 107 to which the pins 106 are suitably secured.

The thumb piece 107 is mounted to rotate on the rod 99; and is limited in its axial movement thereon by a pin 108 driven with tight fit through an aperture formed transversely in the rod 99 near the outer end thereof. As shown in Figure 2 of the drawings, the pins 106 are in their lowest position in the notches which form the cam surfaces 105. Consequently, the pins 89 engage the teeth of the pinion 88 so that rotation of the crank plate 93 effects a direct, or 1:1, drive of the reel shaft 16. As shown in Figure 7 of the drawings, the pins 106 ride on the flat outer edge of the boss 103. In this position the pins 89 are out of engagement with the teeth of the pinion 88.

To effect engagement between the teeth of pinion 88 and gear ring 97, the supporting ring 96 has a lug 109 extending radially therefrom, to swing about a pivot bolt 110 screwthreaded into the end wall 13. Diametrically opposite to the lug 109, the ring 96 is provided with an extension plate 111 having an arcuate slot 112 formed therein, to receive a stud 113 secured to the end wall 13. The outer end of the stud 113 is screwthreaded to receive the knurled clamping nut 114 having a boss 115 formed on its lower surface to seat in the recesses 116 and 117 formed in face of plate 111 at the opposite ends of the slot 112.

Figure 5:
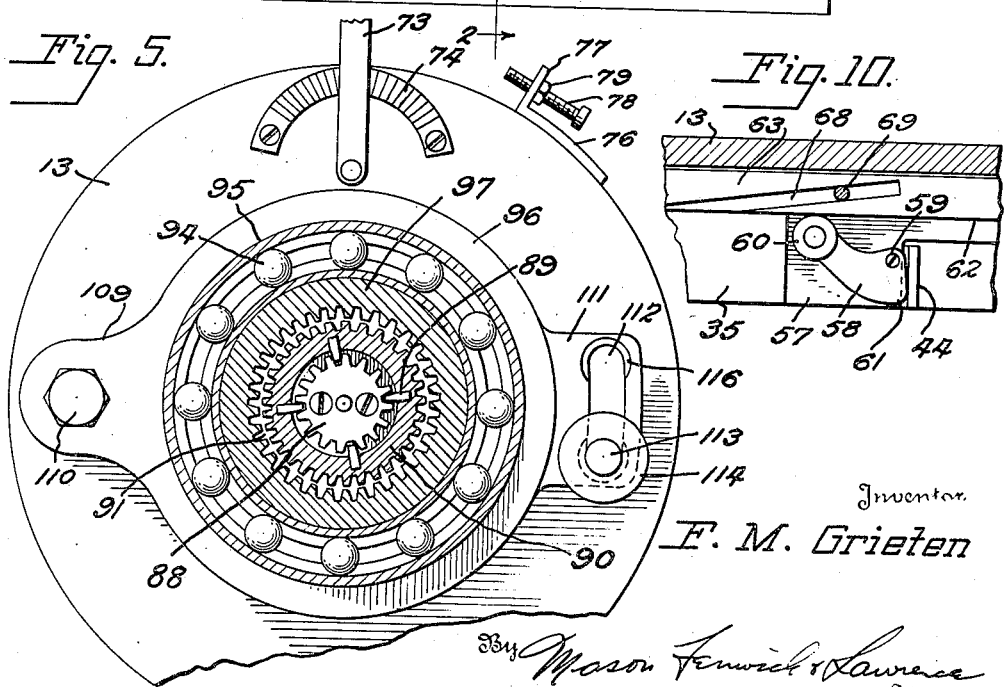
Figure 5 is a section taken on the line 5—5 of Figure 2.

As shown in Figure 6, the supporting ring 96 has been swung about its pivot 110 from the position shown in Figures 1 and 5 to effect engagement between the teeth of pinion 88 and gear 97. In this position the boss 115 of the nut 114 is seated in the recess 116 and locks the ring 96 securely in its new position.

The crank plate 93 has an arm 118 extended therefrom (see Figures 1 and 8) to form a support for a pivot sleeve 119, having a handle 120 pivoted to its outer end in the usual manner.

It will be apparent from the disclosure herein, that I have provided a reel in which the braking tension may be adjusted to any desired extent almost instantly; and in which the gear shift from one ratio to another may be effected positively whenever desired.

While I have shown and described a particular embodiment of my invention, it must be understood that the invention is not to be considered as limited to the form, nor in any other manner except as indicated by the scope of the claims appended hereto.

What I claim is:

1. A fishing reel adapted to be secured to a support and comprising: a frame including housing plates spaced apart substantially parallel to each other, a spool shaft journaled in said housing plates, a brake drum fixed to said shaft, a disk journaled to rotate in said housing about the axis of said shaft, a brake shoe movably mounted on and extending laterally from said disk over and normally out of contact with said brake drum, a ring mounted in said housing to slide axially over said brake shoe, and means of said brake shoe operable by contact with said ring for moving said shoe into braking contact with said drum.

2. A fishing reel adapted to be secured to a support and comprising: a frame including housing plates spaced apart substantially parallel to each other, a spool shaft journaled in said housing plates, a brake drum fixed to said shaft, a disk journaled to rotate in said housing about the axis of said shaft, a brake shoe movably mounted on and extending laterally from said disk over and normally out of contact with said brake drum, a ring mounted to rotate in said housing about the axis of said shaft and to slide axially over said brake shoe, means for rotating and sliding said ring, and means on said brake shoe operable by contact with said ring for moving said shoe into braking contact with said drum.

3. A fishing reel adapted to be secured to a support and comprising: a frame including housing plates spaced apart substantially parallel to each other, a spool shaft journaled in said housing plates, a brake drum fixed to said shaft, a disk journaled to rotate in said housing about the axis of said shaft, a brake shoe movably mounted on and extending laterally from said disk over and normally out of contact with said brake drum, a ring mounted in said housing to slide axially over said brake shoe, and means of said brake shoe operable by contact with said ring for moving said shoe into braking contact with said drum, a ratchet ring fixed to one of said housing plates concentric with the axis of said shaft, and a pawl projecting yieldingly from said disk against the teeth of said ratchet ring to prevent rotation of said shaft in one direction.

4. A fishing reel adapted to be secured to a support and comprising: a frame including housing plates spaced apart substantially parallel to each other, a spool shaft journaled in said housing plates, a brake drum fixed to said shaft, a disk journaled to rotate in said housing about the axis of said shaft, a brake shoe movably mounted on and extending laterally from said disk over and normally out of contact with said brake drum, a ring mounted in said housing to slide axially over said brake shoe, and means of said brake shoe operable by contact with said ring for moving said shoe into braking contact with said drum, and cooperating ratchet and pawl mechanism on one of said plates and said disk to prevent rotation of said shaft in one direction.

5. A fishing reel adapted to be secured to a support and comprising: a frame including housing plates spaced apart substantially parallel to each other, a spool shaft journaled in said housing plates, a brake drum fixed to said shaft, a disk journaled to rotate in said housing about the axis of said shaft, a brake shoe movably mounted on and extending laterally from said disk over and normally out of contact with said brake drum, a ring mounted to rotate in said housing about the axis of said shaft and to slide axially over said brake shoe, cooperating means in said housing and ring to cause the ring to slide axially of said shaft by the rotation thereof, and means on said shoe operable by contact with said ring for moving the shoe into braking contact with said drum.

6. A fishing reel adapted to be secured to a support and comprising: a frame including housing plates spaced apart substantially parallel to each other, a spool shaft journaled in said housing plates, a brake drum fixed to said shaft, a disk journaled to rotate in said housing about the axis of said shaft, a brake shoe movably mounted on and extending laterally from said disk over and normally out of contact with said brake drum, a ring mounted in said housing to slide axially over said brake shoe, and means of said brake shoe operable by contact with said ring for moving said shoe into braking contact with said drum, a crank handle for said shaft, and cooperating means on said handle and shaft for varying the speed of rotation of said shaft.

7. A fishing reel adapted to be secured to a support and comprising: a frame including housing plates spaced apart substantially parallel to each other, a spool shaft journaled in said housing plates, a brake drum fixed to said shaft, a disk journaled to rotate in said housing about the axis of said shaft, a brake shoe movably mounted on and extending laterally from said disk over and normally out of contact with said brake drum, a ring mounted in said housing to slide axially over said brake shoe, and means of said brake shoe operable by contact with said ring for moving said shoe into braking contact with said drum, a pinion rotatable with said drum in axial alinement with said shaft, a supporting ring pivoted to one of said housing plates, a crank handle rotatable in said ring, and internal gears of different diameters mounted on said handle, and adapted to be alternatively meshed with said pinion to vary the speed of rotation of said shaft.

8. A fishing reel adapted to be secured to a support and comprising: a frame including housing plates spaced apart substantially parallel to each other, a spool shaft journaled in said housing plates, a brake drum fixed to said shaft, a disk journaled to rotate in said housing about the axis of said shaft, a brake shoe movably mounted on and extending laterally from said disk over and normally out of contact with said brake drum, a ring mounted in said housing to slide axially over said brake shoe, and means of said brake shoe operable by contact with said ring for moving said shoe into braking contact with said drum, a pinion, means connecting the pinion to said drum to rotate therewith about the axis of said shaft, a supporting ring pivoted to one of said housing plates, at one side of the center thereof, a crank handle rotatable in said ring, a pair of concentric internal gears fixed to said handle, one of said gears being slidable out of mesh with said pinion to permit engagement of the other gear with said pinion, and means for locking said ring to said plate in position to hold either of said gears in engagement with said pinion.

9. The device set forth in claim 8, in combination with means on said crank handle for moving the smaller of said internal gears into and out of mesh with said pinion.

FREDERICK MARTIN GRIETEN.